US012788031B2

(12) United States Patent
Purl et al.

(10) Patent No.: US 12,788,031 B2
(45) Date of Patent: Nov. 10, 2026

(54) COMPOSITIONS FOR SHELF STABLE WET PET FOOD APPLICATIONS

(71) Applicant: Cargill, Incorporated, Wayzata, MN (US)

(72) Inventors: Joseph Purl, Jordan, MN (US); Varatharajan Vamadevan, Plymouth, MN (US)

(73) Assignee: Cargill, Incorporated, Wayzata, MN (US)

( * ) Notice: Subject to any disclaimer, the term of this patent is extended or adjusted under 35 U.S.C. 154(b) by 544 days.

(21) Appl. No.: 17/431,208

(22) PCT Filed: Feb. 14, 2020

(86) PCT No.: PCT/US2020/018284
§ 371 (c)(1),
(2) Date: Aug. 16, 2021

(87) PCT Pub. No.: WO2020/172062
PCT Pub. Date: Aug. 27, 2020

(65) Prior Publication Data

US 2022/0132890 A1 May 5, 2022

Related U.S. Application Data

(60) Provisional application No. 62/808,432, filed on Feb. 21, 2019.

(51) Int. Cl.

| | |
|---|---|
| ***A23K 20/163*** | (2016.01) |
| ***A23K 10/30*** | (2016.01) |
| ***A23K 20/22*** | (2016.01) |
| ***A23K 50/48*** | (2016.01) |

(52) U.S. Cl.
CPC ............ *A23K 20/163* (2016.05); *A23K 10/30* (2016.05); *A23K 20/22* (2016.05); *A23K 50/48* (2016.05)

(58) Field of Classification Search
CPC ...... A23K 20/163; A23K 10/30; A23K 20/22; A23K 50/48; C08B 30/12
USPC ........................................................ 426/661
See application file for complete search history.

(56) References Cited

U.S. PATENT DOCUMENTS

| | | | | |
|---|---|---|---|---|
| 3,959,514 A | | 5/1976 | Eastman | |
| 3,970,767 A | | 7/1976 | Tessler | |
| H1527 H | * | 4/1996 | Moore | A21D 13/068 426/660 |
| 6,221,420 B1 | | 4/2001 | Thomas | |
| 2001/0017133 A1 | * | 8/2001 | Chiu | A23L 7/165 127/29 |
| 2013/0337118 A1 | | 12/2013 | Sistrunk | |
| 2017/0064978 A1 | | 3/2017 | Hanchett | |
| 2018/0249748 A1 | | 9/2018 | Sharma | |

FOREIGN PATENT DOCUMENTS

| | | | | |
|---|---|---|---|---|
| CA | 1071009 A | | 2/1980 | |
| CA | 2847586 A1 | | 9/2014 | |
| CN | 104068307 A | | 10/2014 | |
| CN | 101904345 B | | 12/2014 | |
| EP | 1241216 A1 | * | 9/2002 | A23L 23/00 |
| EP | 2786660 A1 | | 10/2014 | |
| WO | 9603892 W | | 2/1996 | |

OTHER PUBLICATIONS

NPL cp vs Barber unit (Retrieved on Feb. 2024). (Year: 2024).*
NPL Flour and Starch (Retrieved on Apr. 4, 2025). (Year: 2025).*

* cited by examiner

*Primary Examiner* — Erik Kashnikow
*Assistant Examiner* — Bhaskar Mukhopadhyay

(57) ABSTRACT

Described herein is a composition used for shelf-stable, wet pet food applications, comprising a blend of a first starch or flour and a second starch or flour, wherein the blend makes up 1-10 wt % of the composition and wherein the first starch or flour is a TI or HMT starch or flour and a salt component making up 0.1-5 wt % of the composition; wherein the composition has a post-retort viscosity of less than 1500 centipoise measured at 165° F.

21 Claims, No Drawings

COMPOSITIONS FOR SHELF STABLE WET PET FOOD APPLICATIONS

CROSS REFERENCE TO RELATED APPLICATIONS

This application is a national phase application of PCT/US2020/018284, filed Feb. 14, 2020, which claims the benefit of U.S. Provisional Application No. 62/808,432, filed Feb. 21, 2019, which are hereby incorporated by reference in their entirety.

TECHNICAL FIELD

This application relates to compositions used in shelf-stable wet pet food applications, comprising thermally inhibited or heat moisture treated starch or flour and a minimal salt component.

BACKGROUND

Consumers are asking for label friendly starches in pet food applications. While there is a desire to create label-friendly starches, there is also a desire for such starches to have desirable performance and functionality characteristics.

SUMMARY

Described herein is a composition used for shelf-stable, wet pet food applications, comprising a blend of a first starch or flour and a second starch or flour, wherein the blend makes up 1-10 wt % of the composition and wherein the first starch or flour is a TI or HMT starch or flour and a salt component making up 0.1-5 wt % of the composition; wherein the composition has a post-retort viscosity of less than 1500 centipoise measured at 165° F.

In another aspect, described herein is a composition used for shelf-stable, wet pet food applications, comprising a starch or flour that makes up 1-10 wt % of the composition and wherein the first starch or flour is a TI or HMT starch or flour and a salt component making up 0.1-5 wt % of the composition; wherein the composition has a post-retort viscosity of less than 1500 centipoise measured at 165° F.

DETAILED DESCRIPTION

Described herein is a label friendly, physically modified starch and/or flour composition comprising a salt component for use in shelf-stable, wet pet food applications.

The composition described herein comprises at least a blend of a first starch and a second starch or flour and a salt component. The remaining balance of the composition can be water and/or other ingredients typically found in wet pet food applications. The composition described herein is desirable for use in shelf-stable, wet pet food applications because it demonstrates strong slow freeze-thaw stability and post-retort viscosity functionality. It shall be understood that the term "retort" is collectively meant to include retort applications, UHT (ultra-high temperature processing) or aseptic applications. Furthermore, the salt component is lower than other traditional compositions.

The first starch in the blend can be a thermally inhibited ("TI") or heat moisture treated ("HMT") starch or flour. Example of such TI or HMT starch or flour can be derived from amylose containing starches or waxy starches, such as corn, tapioca (note that the term "tapioca" may also be referred to as cassava, yucca, manioc, mandioca, or Brazilian arrowroot), rice, wheat, oat, barley, rye, millet, sorghum, potato, arrowroot, canna, legume or pulses, quinoa and yam. In some aspects, the TI or HMT starch or flour can be an instant starch or flour derived from similar sources.

The second starch or flour in the blend can include native starches and flours (waxy and amylose containing) derived from sources such as corn, tapioca, rice, wheat, oat, barley, rye, millet, sorghum, potato, arrowroot, canna, legume or pulses, quinoa and yam. Further, in some aspects the first starch or second starch or flour can be derived from highly phosphorylated (>900 ppm phosphorus content) potato or highly phosphorylated (>900 ppm phosphorus content) waxy potato or SSIII mutant potato or SSIII mutant waxy potato or SSIII and BE1 double mutant potato or SSIII, BE1 mutant waxy potato or short chain amylopectin waxy potato mutant (lack of or non-functional GBSS1 combine with deficient or non-functional SSII and/or SSIII enzymes) or arrow root powder.

In the blend, the first starch makes up at least 50% of the blend, and in some cases at least 60%, at least 70%, at least 80%, and at least 90%.

Further, the blend makes up 1-10 wt % of the composition. In some aspects, the blend makes up 3-6 wt % of the composition.

It shall be understood that in some aspects, there may not be a blend of a first starch and second starch but rather a starch component comprised solely of the first starch. Such starch component also makes up 1-10 wt % of the composition and in some aspects, 3-6 wt % of the composition.

The salt component in the composition makes up 0.1-5 wt % of the composition. In some aspects, the salt component makes up 0.3-3 wt % of the composition. The salt component can be for example a salt, a salt source, or ionic compounds. The salt component is selected from metallic cations or halogenide anions or other solubilized ionic compounds that can break the hydrogen bonds between glucan chains. The salt component can be for example but not limited to sodium chloride, potassium chloride, calcium chloride, sodium phosphate, calcium rich fibers (e.g., millet), calcium rich micronized fibers, nixtamalized starch or flour (starch or flour treated with calcium source), or starch treated with saturated salt solution or starch created with starch or flour annealed or heat moisture treated with calcium or other salts, calcium oxide, or mixtures thereof.

Such TI starch or flour is made starting with a starch or flour. A starch or flour and water slurry is prepared, wherein the starch or flour comprises about 30-35 wt % of the slurry. Alternatively, the starch or flour may comprise a higher content of the slurry, for example greater than 60 wt %. The pH of the slurry is adjusted to about 8.5 to 10.5 using any alkaline source for example sodium carbonate. The slurry is then dewatered and dried (the dewatering step is not required for slurry compositions having dry solids contents greater than 60 wt %). Subsequently, the dewatered materials is dehydrated for a time at a temperature of 100° C.-120° C. sufficient to render the starch anhydrous or substantially anhydrous, and preferably having a content of less than 0.5 wt % moisture. Next, the starch or flour to a temperature ranging from about 140° C.-180° C. and in some aspects from about 150° C.-170° C. to for a period of time ranging from about 0.5 to about 20 hours and in some aspects from about 1 to about 20 hours to achieve thermal inhibition. Thermal inhibition is a physical modification process viewed more favorably amongst consumers as an alternative to chemical modification. It shall be understood that various technologies can be used to achieve thermal inhibition, for example but not limited to fluidized bed reactor, paddle mixer reactor, vibrating spiral conveyor, microwave, and radiofrequency technologies.

HMT starch or flour is made by obtaining starch or flour and adjusting its moisture content to a range of about 10 wt % to 40 wt %, and in some aspects from about 15 wt % to 35 wt %. The moisture adjusted starch or flour is heated to a temperature ranging from about 40-150° C., and in some aspects from about 85-130° C. for about 0.5 to about 16 hours to obtain HMT starch or flour. It shall be understood that various moisture and heat treatments can be used to achieve heat and/or moisture treatment and the aspect described herein in just one aspect. Contrastingly, an annealing process has similar processing steps as the HMT process but occurs under lower temperatures (below starch gelatinization temperature) and excess (>65% w/w) or intermediate water levels (40% to 55% w/w).

The composition can optionally comprise water, non-starch hydrocolloids (e.g., xanthan gum), plant-derived fibers, for example cereal fibers, legume fibers (e.g., pea, lentil, bean), vegetable fibers or pectins, root (e.g., tapioca/beet) or tuber (e.g., potato) fibers, or fruit fibers, or pectin (e.g., citrus), or pectin free fibers, carboxylated polymers, carboxy methyl cellulose, hydroxypropylated methyl cellulose, hydrolyzed flour or starch, soluble flour, instant starches or flour, pregelatinized starches, partially pregelatinized starches, TI treated instant starches/cold-water swelling starches, TI treated partially pregelatinized starches, TI pregelatinized starches, and/or beta amylase or alpha amylase treated starches or flour.

The composition described herein demonstrates slow freeze thaw stability and can survive at least one slow freeze thaw cycle demonstrating no syneresis. In preferred aspects, the composition can survive at least two, at least three, and at least four slow freeze thaw cycles. An aspect of such slow freeze thaw method is described in U.S. Patent Publication US2017/0064978. Passing or surviving a slow freeze thaw cycle means no graininess, syneresis, or gelling is observed. A pass is given a rating of "1" and a fail is given a rating of "3"—observations between the two are given a rating of "2."

The compositions described herein work well in retort applications as they withstand retort processes and maintain viscosity through pre and post retort. In typical retort processes, the composition is heated to a temperature of about 160-180° F. in a Vorwerk on 3.5 and hold for 5 minutes at 170° F. Note that when instant starches or flours are used in the blend, there may not me a need to heat to this temperature. The initial viscosity is measured at 165° F. using a Brookfield Viscometer (Model: Brookfield DV-II+Pro). The composition is added to cans which are then sealed. The cans are retorted for 60 minutes at 250° F. (static) then cooled to below 100° F. The cans are equilibrated overnight and heated to 170° F. in water bath unopened. The post retort viscosity is ten measured at 165° F.

For these compositions, at least 25% of viscosity remains from pre-retort to post-retort, and in some aspects at least 30% of viscosity remains from pre-retort to post-retort, and in some aspects at least 40% of viscosity remains from pre-retort to post-retort, and in some aspects at least 75% of viscosity remains from pre-retort to post-retort.

The composition described herein typically has a post-retort viscosity of less than 1500 centipoise, less than 1200 centipoise, less than 750 centipoise, less than 700 centipoise, less than 200 centipoise, or less than 150 centipoise, and less than 100 centipoise; wherein viscosity is measured at a temperature of 165° F.

EXAMPLES

Example 1: Compositions Comprising Thermally Inhibited Grain Based Starches and Flours The components of the composition and inclusion rates are detailed in Table 1 with the remaining balance of the composition being water.

TABLE 1

| Sample ID | Starch/Flour Component | Starch/Flour usage level (%) | Salt (NaCl) (%) |
|---|---|---|---|
| T1 | TI waxy corn:native waxy corn (50:50) | 4.5 | 0.3 |
| T2 | TI waxy corn:native waxy corn (50:50) | 4.5 | 1.0 |
| T3 | TI waxy corn:native waxy corn (50:50) | 4.5 | 3.0 |
| T4 | TI waxy rice starch:native rice flour (50:50) | 5.0 | 1.0 |
| T5 | TI tapioca:Tapioca flour (70:30) | 5.0 | 1.0 |
| T6 | TI waxy corn:Citrus fiber (90:10) | 5.0 | 1.0 |

To measure retort, the composition is heated to 170° F. in a Vorwerk on 3.5 and hold for 5 minutes at 170° F. Measure initial viscosity at 165° F. using a Brookfield Viscometer (Model: Brookfield DV-II+Pro). Fill 300×407 cans with 12/32's headspace and seam cans. Retort for 60 minutes at 250° F. (Static) then cool to below 100° F. Allow cans to equilibrate overnight and heat to 170° F. in water bath unopened. Measure post retort viscosity at 165° F. Tables 2 and 3 provide raw data for pre and post retort.

TABLE 2

| Sample ID | Spindle | RPM | Pre-retort viscosity (cp) | Temperature (° F.) |
|---|---|---|---|---|
| T1 | 6 | 50 | 380 | 165 |
| T2 | 6 | 50 | 408 | 165 |
| T3 | 6 | 50 | 448 | 165 |
| T4 | 2 | 50 | 24.5 | 165 |
| T5 | 6 | 50 | 217.5 | 165 |
| T6 | 6 | 50 | 1200 | 165 |

TABLE 3

| Sample ID | Spindle | RPM | Post-retort viscosity (cp) | Temperature (° F.) |
|---|---|---|---|---|
| T1 | 5 | 50 | 98.2 | 165 |
| T2 | 5 | 50 | 126 | 165 |
| T3 | 5 | 50 | 113 | 165 |
| T4 | 3 | 50 | 29.6 | 165 |
| T5 | 6 | 50 | 605 | 165 |
| T6 | 6 | 50 | 1518 | 165 |

It shall be understood that target viscosity can be achieved by manipulating the amount of citrus fiber of T6 composite.

The compositions also underwent slow freeze thaw cycles and the results are demonstrated in Table 4. In some instances, certain compositions survived up to 5 slow freeze thaw cycles.

TABLE 4

| | 1st Slow Freeze Thaw review | 2nd Slow Freeze Thaw review | 3rd Slow Freeze Thaw review | 4th Slow Freeze Thaw review | 5th Slow Freeze Thaw review |
|---|---|---|---|---|---|
| T1 | Completely gelled, failed-3 | Completely gelled, failed-3 | Completely gelled, failed-3 | Completely gelled, failed-3 | Completely gelled, failed-3 |
| T2 | Turbid with slight graininess visible, still flowable-1 | Turbid and graininess visible, still flowable no visible chunks or gelling-1 | Turbid and graininess visible, still flowable visible chunks-3 | Turbid and graininess visible, still flowable visible chunks-3 | Turbid and graininess visible, still flowable visible chunks-3 |
| T3 | Clear, no graininess or turbidity-flowable-1 | Clear, no graininess or turbidity-flowable-1 | Clear, Slightly grainy, No turbidity-flowable-1 | Clear, Slightly grainy, No turbidity-flowable-1 | Clear, Slightly grainy, No turbidity-flowable-1 |
| T4 | clear, thin, no gelling or turbidity present-cleanest appearance of all samples-1 | clear, thin, no gelling or turbidity present-cleanest appearance of all samples-1 | clear, thin, no gelling or turbidity present-cleanest appearance of all samples-1 | clear, thin, no gelling or turbidity present-cleanest appearance of all samples-1 | clear, thin, no gelling or turbidity present-cleanest appearance of all samples-1 |
| T5 | fully gelled, failed-3 | fully gelled, failed-3 | fully gelled, failed-3 | fully gelled, failed-3 | fully gelled, failed-3 |
| T6 | lumpy, gelled with some syneresis-failed-not much different than what came directly out of the retort-failed-3 | lumpy, gelled with more syneresis than 1st F/T cycle-failed-3 | lumpy, gelled with more syneresis than 1st F/T cycle-failed-3 | lumpy, gelled with more syneresis than 1st F/T cycle-failed-3 | lumpy, gelled with more syneresis than 1st F/T cycle-failed-3 |

Example 2: Compositions Comprising Thermally Inhibited and Heat Moisture Treated Waxy Tapioca Compositions comprising TI waxy tapioca and HMT waxy tapioca with varying levels of salt were tested. The same retort process described in Example 1 was utilized to determine pre and post-retort viscosities. Results are found in Table 5 and 6. All compositions demonstrated desirable post-retort viscosities. Furthermore, the compositions underwent various slow freeze thaw cycles and Table 7 provides the outcome of the cycles, some of which survived up to 5 slow freeze thaw cycles.

TABLE 5

| Sample- pre retort | Starch usage level in slurry (%) | Salt (%) | Spindle | RPM | Pre Retort Viscosity (cp) | % | Temperature (° F.) |
|---|---|---|---|---|---|---|---|
| TI waxy tapioca:HMT waxy tapioca 70:30 - No salt | 5.0 | 0 | 6 | 50 | 811 | 43 | 165 |
| TI waxy tapioca:HMT waxy tapioca 70:30 - 1% salt | 5.0 | 1 | 6 | 50 | 830 | 43 | 165 |
| TI waxy tapioca:HMT waxy tapioca 70:30 - 3% salt | 5.0 | 3 | 6 | 50 | 847 | 45.2 | 165 |

TABLE 6

| Sample- post retort | Starch usage level (%) | Salt (KCl %) | Spindle | RPM | Post Retort viscosity (cp) | % | Temperature (° F.) |
|---|---|---|---|---|---|---|---|
| TI waxy tapioca:HMT waxy tapioca 70:30 - No salt | 5.0 | 0.0 | 6 | 50 | 245.6 | 13.2 | 165 |
| TI waxy tapioca:HMT waxy tapioca 70:30 - 1% salt | 5.0 | 1.0 | 6 | 50 | 335 | 17.9 | 165 |
| TI waxy tapioca:HMT waxy tapioca 70:30 - 3% salt | 5.0 | 3.0 | 6 | 50 | 350.6 | 18.7 | 165 |

TABLE 7

| F/T cycle | No salt added-Fast freeze Fast thaw | 0% salt added-Slow freeze Slow thaw | 1% Salt added-Slow freeze Slow thaw | 3% Salt added-Slow freeze Slow thaw |
|---|---|---|---|---|
| Freeze thaw #1 | No syneresis, no gelling, slightly thicker, flowable, no graininess-1 | Clears separation into two phases, syneresis beginning to form, gelling apparent, structure still slightly fluid, not one solid structure | Smooth and pourable no gelling, no graininess, no syneresis-1 | Smooth & pourable, no gelling, no graininess, no synerisis-1 |
| Freeze thaw #2 | Some gelling, swirls of discoloration/turbidity, graininess beginning to appear-2 | Fully gelled/sponged-heavy syneresis-Complete fail-3 | Smooth and pourable, beginning to see signs of a slight grainy texture, more viscous than previous freeze thaw-1 | Smooth and pourable, no graininess or gelling-beginning to build slightly more viscosity-1 |
| Freeze thaw #3 | Thick, broken, gelling, grainy, no visible syneresis, beginning to see two separate phases-3 | Fully gelled/sponged-heavy syneresis-Complete fail-3 | Graininess is apparent-intermittent/swirled turbidity, still flowable-2 | Slightly more viscous but still clear and flowable, no gelling or graininess visible, no turbidity present-1 |
| Freeze thaw #4 | Definite two phase separation-clear signs of syneresis-3 | Fully gelled/sponged-heavy syneresis-Complete fail-3 | Graininess is apparent-intermittent/swirled turbidity, beginning to form chunks still flowable-3 | Slightly more viscous, no gelling slight visible graininess, slight turbidity present, still flowable-1 |
| Freeze thaw #5 | Gelled into one solid mass with a layer of syneresis-3 | Fully gelled/sponged-heavy syneresis-Complete fail-3 | Graininess is apparent-intermittent/swirled turbidity, beginning to form chunks still flowable-3 | slightly more viscous, no gelling visible graininess, slight turbidity present, still flowable-1 |

Example 3: Compositions Comprising Native Waxy Corn and Thermally Inhibited Waxy Corn A composition of native waxy corn and thermally inhibited waxy corn with KCl were tested and is referenced in Table 8. The same retort process described in Example 1 was utilized to determine pre and post-retort viscosities. Results are found in Tables 9 and 10.

TABLE 8

| | Percentage (%) | Weight (g) |
|---|---|---|
| water | 94.70 | 2367.5 |
| Native waxy corn | 2.25 | 56.25 |
| TI waxy corn | 2.25 | 56.25 |
| KCl | 0.80 | 20 |
| Total | 100.00 | 2500 |

TABLE 9

| Sample- Pre retort | starch usage level (%) | Spindle | RPM | cp | % | Temp F. | KCl (%) |
|---|---|---|---|---|---|---|---|
| TI waxy corn:native waxy corn 50:50 | 4.5 | 6 | 50 | 1248 | 67 | 165 | 0.8 |

TABLE 10

| Sample- Post retort | starch usage level | Spindle | RPM | cp | % | Temp F. | KCl % |
|---|---|---|---|---|---|---|---|
| TI waxy corn:native waxy corn 50:50- Test cans | 4.5% | 6 | 50 | 350.7 | 19% | 165 | 0.8% |

The invention claimed is:

1. A composition used for shelf-stable, wet pet food applications, comprising:

a blend of a first starch and a second starch, wherein the blend makes up 1-10 wt % of the composition, wherein the first starch is a thermally inhibited (TI) or heat moisture treated (HMT) starch, wherein the first starch is not a flour, wherein the second starch is a native starch, and wherein the first starch makes up at least 50% of the blend, wherein the second starch is not a flour; and a salt component making up 0.1-5 wt % of the composition;

wherein:

the composition has a post-retort viscosity of less than 1500 centipoise measured at 165° F. when retorted for 60 minutes at 250° F.;

the post-retort viscosity is at least 25% of the pre-retort viscosity; and the TI starch is not chemically modified.

2. The composition of claim 1, wherein the starch is amylose containing or waxy starch.

3. The composition of claim 1, wherein the starch is derived from corn, rice, wheat, oat, barley, rye, millet, sorghum, tapioca, potato, arrowroot, canna, legume or pulses, quinoa or yam.

4. The composition of claim 1, wherein the salt component is selected from the group consisting of metallic cations or halogenide anions or other solubilized ionic compounds that can break the hydrogen bonds between glucan chains.

5. The composition of claim 1, wherein the salt component is selected from the group consisting of sodium chloride, potassium chloride, calcium chloride, and sodium phosphate.

6. The composition of claim 1, wherein the post-retort viscosity is less than 1200 centipoise measured at 165° F.

7. The composition of claim 1, wherein the post-retort viscosity is less than 750 centipoise measured at 165° F.

8. The composition of claim 1, wherein the post-retort viscosity is less than 700 centipoise measured at 165° F.

9. The composition of claim 1, wherein the post-retort viscosity is less than 200 centipoise measured at 165° F.

10. The composition of claim 1, wherein the post-retort viscosity is less than 150 centipoise measured at 165° F.

11. The composition of claim 1, wherein the post-retort viscosity is less than 100 centipoise measured at 165° F.

12. The composition of claim 1, wherein the salt component makes up 0.3-3 wt % of the composition.

13. The composition of claim 1, wherein the composition survives a first slow freeze thaw cycle.

14. The composition of claim 1, wherein the composition survives up to five slow freeze thaw cycles.

15. The composition of claim 1, further comprising water, carboxylated polymer, gums, legume fiber, vegetable fiber, root or tuber fiber, hydrolyzed starch, instant starch, TI treated instant starch, or combinations thereof.

16. The composition of claim 1, wherein the post-retort viscosity is at least 30% of the pre-retort viscosity.

17. The composition of claim 1, wherein the post-retort viscosity is at least 75% of the pre-retort viscosity.

18. A composition used for shelf-stable, wet pet food applications, comprising:

a blend of a first starch or flour and a second starch or flour, wherein the blend makes up 1-10 wt % of the composition, and wherein the first starch or flour is a TI starch or flour and the second starch or flour is a HMT starch or flour; and a salt component making up 0.1-5 wt % of the composition;

wherein:

the composition has a post-retort viscosity of less than 1500 centipoise measured at 165° F.;

the post-retort viscosity is at least 25% of the pre-retort viscosity; and the TI starch or flour is not chemically modified.

19. The composition of claim 1, wherein the blend makes up 3-6 wt % of the composition.

20. The composition of claim 18, wherein the blend makes up 3-6 wt % of the composition.

21. A composition used for shelf-stable, wet pet food applications, comprising:

a blend of a first starch and a second starch, wherein the blend makes up 1-10 wt % of the composition, wherein the first starch is a heat moisture treated (HMT) instant starch, wherein the second starch is a native starch, and wherein the first starch makes up at least 50% of the blend; and a salt component making up 0.1-5 wt % of the composition; wherein:

the composition has a post-retort viscosity of less than 1500 centipoise measured at 165° F. when retorted for 60 minutes at 250° F.;

the post-retort viscosity is at least 25% of the pre-retort viscosity.

* * * * *